(12) United States Patent
Janssen et al.

(10) Patent No.: US 9,243,677 B2
(45) Date of Patent: Jan. 26, 2016

(54) VIBRATION ISOLATOR

(75) Inventors: Jeroen Lodevicus Gerardus Janssen, Eindhoven (NL); Johannes Jacobus Hubertus Paulides, Waalwijk (NL); Elena Andreevna Lomonova, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 240 days.

(21) Appl. No.: 13/977,972

(22) PCT Filed: Dec. 22, 2011

(86) PCT No.: PCT/EP2011/073785
§ 371 (c)(1),
(2), (4) Date: Jul. 2, 2013

(87) PCT Pub. No.: WO2012/093038
PCT Pub. Date: Jul. 12, 2012

(65) Prior Publication Data
US 2013/0299290 A1    Nov. 14, 2013

(30) Foreign Application Priority Data
Jan. 3, 2011   (EP) .................................... 11150034

(51) Int. Cl.
*F16F 15/03*     (2006.01)
*F16F 6/00*      (2006.01)

(52) U.S. Cl.
CPC ................ *F16F 6/005* (2013.01); *F16F 15/03* (2013.01)

(58) Field of Classification Search
CPC .......... F16F 6/005; F16F 15/03; B60G 11/32; B60G 17/0157

USPC ........ 188/267, 378; 267/136, 140.14, 140.15; 310/51
See application file for complete search history.

(56) References Cited

U.S. PATENT DOCUMENTS

| 4,583,752 | A  | * | 4/1986  | Breitbach ................... 280/6.157 |
| 5,445,249 | A  | * | 8/1995  | Aida et al. ..................... 188/378 |
| 6,231,011 | B1 | * | 5/2001  | Chu et al. ....................... 244/165 |
| 6,325,365 | B1 | * | 12/2001 | Fujita et al. .............. 267/140.15 |

(Continued)

FOREIGN PATENT DOCUMENTS

| DE | 102 05 557 | 7/2003  |
| EP | 1 367 636  | 12/2003 |

(Continued)

OTHER PUBLICATIONS

International Search Report for PCT/EP2011/073785, mailed Jan. 1, 2012.

(Continued)

*Primary Examiner* — Thomas J Williams
*Assistant Examiner* — Mariano Sy
(74) *Attorney, Agent, or Firm* — Nixon & Vanderhye P.C.

(57) ABSTRACT

A vibration isolator is provided comprising a base structure, a load structure and at least one vertical air gap formed by opposing and substantially parallel walls of the base structure and the load structure. The opposing walls being at least partly covered by respective arrays of permanent magnets, neighboring magnets in the arrays having alternating magnetization directions, an arrangement of the permanent magnets in the arrays being such that a gravitational force on the load structure is substantially compensated by a net magnetic force of the base structure on the load structure.

11 Claims, 8 Drawing Sheets

(56) References Cited

U.S. PATENT DOCUMENTS

| | | | |
|---|---|---|---|
| 6,867,511 B2* | 3/2005 | Fukunaga et al. | 310/12.24 |
| 6,879,127 B2* | 4/2005 | Gery | 318/649 |
| 6,954,041 B2* | 10/2005 | Korenaga | 318/135 |
| 7,383,929 B2* | 6/2008 | Korenaga | 188/378 |
| 2002/0003327 A1* | 1/2002 | Enoki et al. | 267/136 |
| 2012/0193179 A1* | 8/2012 | Gysen et al. | 188/267 |

FOREIGN PATENT DOCUMENTS

| | | |
|---|---|---|
| ER | 1 127 741 | 12/1984 |
| WO | WO 2010/136049 | 12/2010 |

OTHER PUBLICATIONS

Written Opinion of the International Searching Authority for PCT/EP2011/073785, mailed Jan. 1, 2012.

* cited by examiner

VIBRATION ISOLATOR

This application is the U.S. national phase of International Application No. PCT/EP2011/073785, filed 22 Dec. 2011, which designated the U.S. and claims priority to EP Application No. 11150034.4, filed 3 Jan. 2011, the entire contents of each of which are hereby incorporated by reference.

FIELD OF THE INVENTION

This invention relates to a vibration isolator comprising a base structure, a load structure and means for compensating a gravitational force on the load structure.

BACKGROUND OF THE INVENTION

Many industrial engineers, such as in lithographic industry, electron beam microscopy and space applications, deal with accurate positioning systems. Vibrations and other types of mechanical disturbances in such machines easily show up as a major factor in limiting the achievable accuracy, hence require significant reduction. Precise reproduction of the features that continue to get smaller requires good isolation from the environment while productivity concerns driven by market requirements require faster motion. Such demands impose special constraints on a vibration isolation design. Since, in many cases, the structural design of the isolated mass provides little inherent vibration isolation, and passive means provide insufficient isolation over the full required bandwidth, active means are often utilized to provide vibration control. In such applications, high-precision vibration isolation of a large payload with a high mass often requires vacuum compatibility, a contactless structure, high force density and low stiffness.

Air-based solutions are commonly used for actively isolating and controlling vibrations and other types of mechanical disturbances. In most lithographic applications, so-called air mounts are used, which are supplemented by electromechanical Lorentz-actuators providing stability control. A control valve regulates the flow of compressed air into a large air tank acting as a pneumatic spring. Unlike steel coil springs, the resonant frequency of this system is nearly independent of the mass of the payload, and the height control valve regulates the operating height. This provides gravity compensation and spring stiffness, where Lorentz actuators ensure stability and accurate positioning in all degrees of freedom.

The isolation bandwidth of the currently often used pneumatic isolators is generally limited. As a result the vibrations at elevated frequencies are not properly extinguished, which limits the performance of the machine being isolated. Furthermore, air bearings are only suitable for vacuum conditions if significant structural changes are applied which may adversely affect their performance.

Magnet-based vibration isolation systems are increasingly considered to be a feasible alternative for the passive or pneumatic vibration isolation systems. They offer distinct features such as being clean, noiseless and vibration and maintenance free. For these reasons they are increasingly being considered for use in vibration isolation applications. Examples of magnet-based vibration isolators are, e.g., found in U.S. Pat. No. 6,307,285

In 'Zero-stiffness magnetic springs for active vibration isolation' by Robertson et al., a permanent magnet system is used for obtaining a low stiffness vibration isolation system. This contactless magnetic spring uses attracting magnetic forces from the magnet above the load structure (negative spring, vertically unstable) and repelling magnetic forces from the bottom side (positive spring, vertically stable). These magnetic forces are oriented mainly along the axis of magnetization of the permanent magnets. The resulting vertical magnetic force compensates for the gravity force which is pulling down the load structure. Because the negative spring on the top and the positive spring at the bottom are placed in a parallel configuration, their respective spring stiffness add up and the resulting stiffness is near zero. This gives a vibration isolation system with a low natural resonance frequency to provide enhanced vibration isolation. It is, however, a disadvantage of this magnetic spring type that the low spring stiffness is very local and as a result the spring stiffness varies significantly with the position. This allows for small movements only when low and constant spring stiffness is required or it requires significant control efforts for stabilization and isolation over a larger movement range. Furthermore, such a double-sided topology requires a 'sandwiched' construction which may proof to be disadvantageous if the vertical spring force exerted by such magnetic spring has to be led around the spring by mechanical means.

OBJECT OF THE INVENTION

It is an object of the invention to provide a vibration isolator which has low stiffness and performs well over a wider range of movement.

SUMMARY OF THE INVENTION

According to a first aspect of the invention, this object is achieved by providing a vibration isolator comprising a base structure, a load structure and at least one vertical air gap formed by opposing and substantially parallel walls of the base structure and the load structure. The opposing walls are at least partly covered by respective arrays of permanent magnets, neighboring magnets in the arrays having alternating magnetization directions and an arrangement of the permanent magnets in the arrays being such that a gravitational force on the load structure is substantially compensated by a net magnetic force of the base structure on the load structure.

The main difference with the magnetic spring of Robertson et al. is that a vertical air gap is used instead of a horizontal one. In Robertson et al., the load structure is pulled towards or pushed away from the magnetic surfaces above or beneath the load structure. Thus, the magnetic force works perpendicular to the opposing magnetic surfaces. The permanent magnets are magnetized in a direction parallel to the direction of the force of gravity which is pulling down the load structure. According to the invention, the matrix arrangement of the permanent magnets is such that individual magnets in the base structure may attract or retract individual magnets in the load structure and vice versa, but the resulting net magnetic force causes the load structure to be pushed in an upward direction, i.e. against gravity. When the magnetic surfaces come in pairs any horizontal forces that may occur are canceled. The load structure is pushed upward in a direction parallel to the opposing surfaces of the magnetic arrays. The vertical air gap gives a high magnetic force with low stiffness. A big advantage of the vibration isolator according to the invention is that the net magnetic force in the vertical direction is constant over a larger range.

It is to be noted that the vibration isolator does not only protect against vibrations, but also against other mechanical disturbances. However, the word vibration isolator will be used, because vibrations are the most common type of mechanical disturbances the system according to the invention tries to deal with.

In an embodiment of the vibration isolator according to the invention, the base structure is a box with a receiving volume and the load structure comprises a block. The shapes and dimensions of the receiving volume and the block are such that the block fits into the receiving volume in order to provide the vertical air gap. The respective arrays of permanent magnets are arranged at at least one inside wall of the receiving volume and at least one outer wall of the block. Alternatively, the load structure comprises the receiving volume and the base structure comprises the block.

In preferred embodiments, multiple walls of the receiving volume and of the load structure are used for carrying arrays of permanent magnets. As a result, possible horizontal components of the net magnetic force on one wall of the load structure may be compensated by horizontal components of the net magnetic force on other walls of the load structure. Alternatively, a non-flat, e.g. circular receiving volume may cause such compensation.

The vibration isolator may comprise at least one electromagnetic compensating unit for actively controlling relative movements of the load structure with respect to the base structure. The compensating units may be part of the base structure and/or the load structure. Such compensating units may fulfill two functions. First, they may bring the load structure back to a neutral position when the spatial deviation of the load structure from this neutral position tends to become too large. Second, they provide stabilization of the load structure, to improve the stability of the passive permanent magnet structure.

These and other aspects of the invention are apparent from and will be elucidated with reference to the embodiments described hereinafter.

DETAILED DESCRIPTION OF THE INVENTION

Figure 1A:
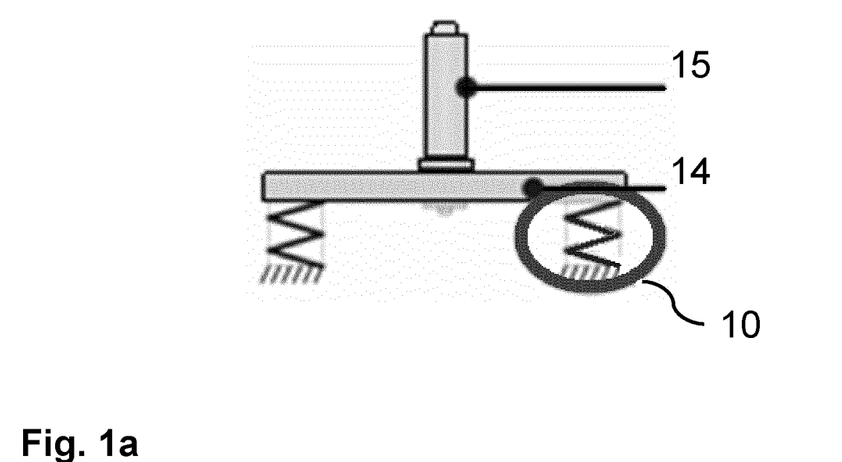
FIG. 1a shows a platform supported by vibration isolators according to the invention.

FIG. 1a shows a platform 14 supported by vibration isolators 10 according to the invention. The platform 14 carries a payload 15 which requires very accurate positioning and vibration isolation. In many technical areas like, e.g., lithographic industry, electron beam microscopy and space applications, it is very important to reduce the influence of vibrations on the accuracy of the positioning systems. The exemplary platform 14 is used in a lithographic machine and carries a lens system 15 for accurately focusing a laser bundle on a silicon wafer positioned underneath the platform 14. Vibration isolators 10 reduce the vibrations in this part of the machine and keep the lens system 15 aligned with the wafer.

Figure 1B:
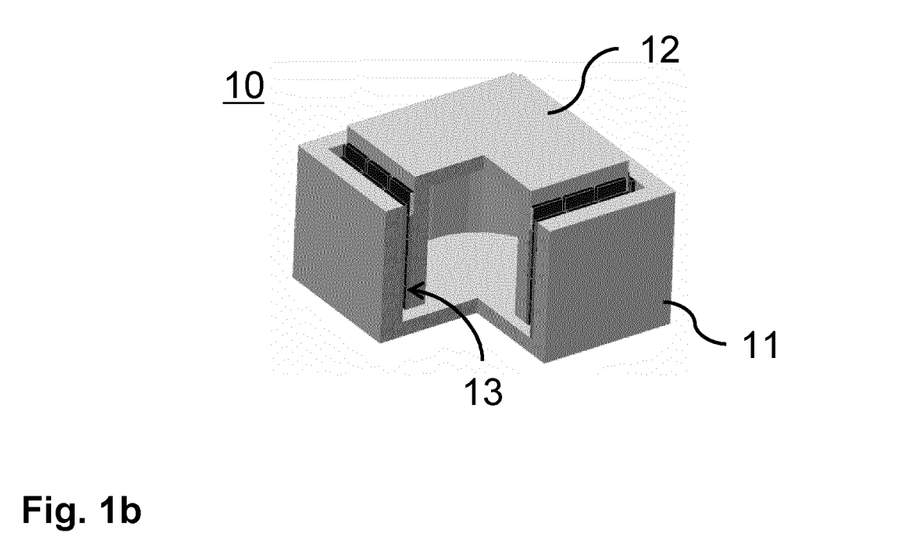
FIG. 1b shows a close-up of a vibration isolator according to the invention.

FIG. 1b shows a close-up of a vibration isolator 10 according to the invention. The vibration isolator comprises a base structure 11 and a load structure 12. The load structure 12 fits into a receiving volume of the base structure 11, such that vertical airgaps 13 are formed in between the inner walls of the receiving volume and the opposing outer walls of the load structure 12. It is to be noted that the airgaps' 13 are not necessarily filled with air, but may also be filled with another gas or gas mixture. In a vacuum environment, the vertical airgaps 13 may just consist of empty space. The payload 15 may be positioned directly on the top surface of the load structure 12 or one to more vibration isolators 10 may be used for supporting a platform 14 for carrying the payload 15. It is to be noted that the respective functions of the base structure 11 and the load structure 12 may be interchanged. When turned upside down, the load structure 12 carries the base structure 11. The receiving volume of the base structure 11 then fits over the load structure 12 and carries the payload 15 or the platform. However, in the following, it will be assumed that the vibration isolator 10 is used in an orientation like shown in FIG. 1b and that the platform 14 is supported by the load structure 12. Similarly, it will be assumed that the load is placed on top of the vibration isolator 10. The vibration isolator 10 according to the invention may however also be used with the load hanging underneath the vibration isolator 10.

Figure 2A:
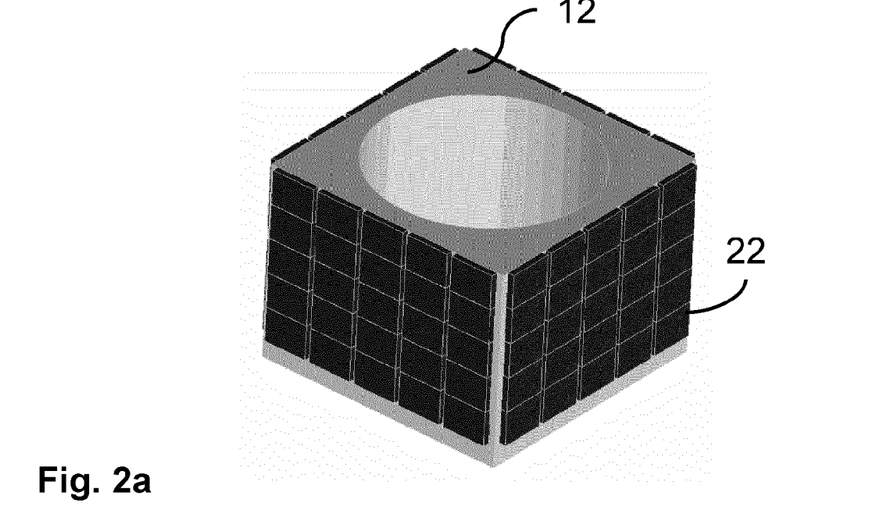
FIG. 2a shows the load structure of the vibration isolator shown in FIG. 1b.

FIG. 2a shows the load structure 12 of the vibration isolator 10 shown in FIG. 1b. The load structure 12 is a massive or hollow block of some material, e.g. a non-magnetic metal like aluminum or a magnetic metal like iron. As will be elucidated later on, the weight of the load structure 12 should be such that the upward magnetic force of the vibration isolator 10 compensates for the gravity pulling at the load structure 12, platform 14 and payload 15. The outer walls of the load structure 12 are supplied with arrays of permanent magnets 22. Neighboring magnets in the arrays 22 have alternating magnetization directions. At least part of the magnets in the arrays 22 are magnetized in a direction perpendicular to the outer wall to which the array 22 is applied.

Figure 2B:
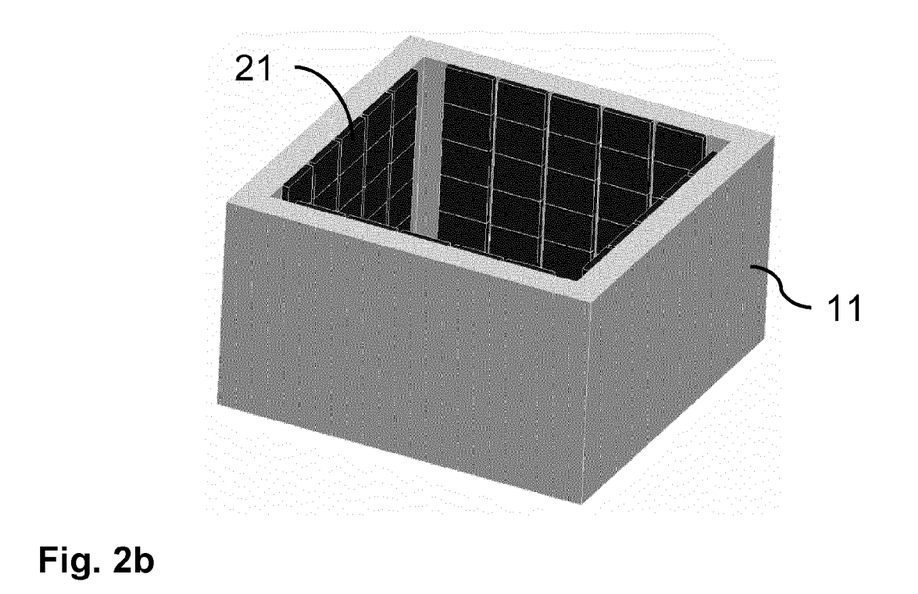
FIG. 2b shows the base structure of the vibration isolator shown in FIG. 1b, FIG. 3a schematically shows how two opposing arrays of permanent magnets may cause an upward net magnetic force.

FIG. 2b shows the base structure 11 of the vibration isolator 10 shown in FIG. 1b. The base structure 11 is a box with, in this example, a rectangular shaped receiving volume. The shape and dimensions of the receiving volume are such that the base structure 11 is able to receive the load structure 12 in order to form the vertical airgaps 13 shown in FIG. 1b. The inner walls of the base structure 11 are also supplied with arrays of permanent magnets 21. Neighboring magnets in the arrays 21 have alternating magnetization directions. At least part of the magnets in the arrays 21 are magnetized in a direction perpendicular to the inner wall to which the array 21 is applied.

In the embodiment of FIGS. 2a and 2b, some space is left open between neighboring magnets in the array, but the magnets may also be arranged without such a gap.

When the load structure 12 is inserted into the receiving volume of the base structure (as shown in FIG. 1b), the magnets in the opposing arrays 21, 22 of the base structure 11 and the load structure 12 cause a net magnetic force that compensates for the weight of the load structure 11, the platform 14 and the payload 15. When the total load weight of the load structure 11, the platform 14 and the payload 15 is in balance with this net magnetic force, the load structure 11 floats in a meta-stable position within the receiving volume, without making contact with any of the inner walls or the bottom of the receiving volume. When the base structure 12 moves relative to the load structure 11, e.g., caused by vibrations, the changing net magnetic force brings the load structure back to this stable position.

To prevent the opposing magnetic arrays 21, 22 from touching each other, mechanical stops may be added to the base structure 11 and/or the load structure 12.

Figure 3A:
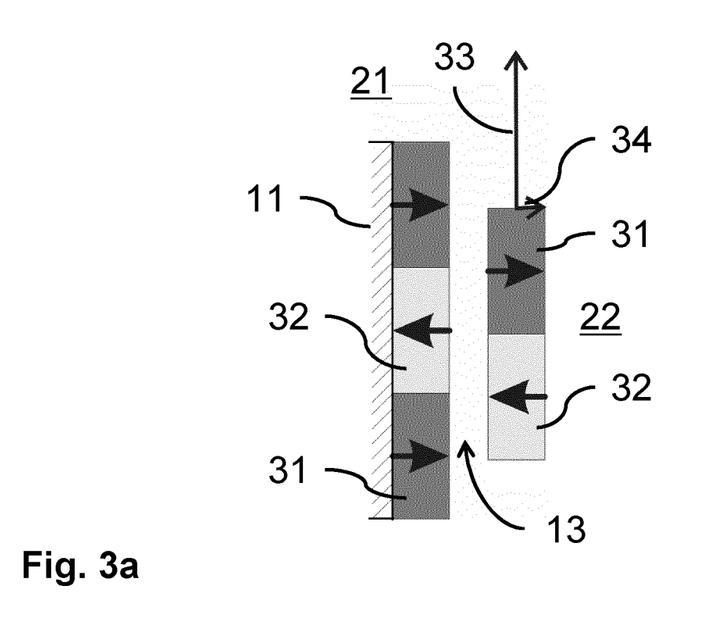

FIG. 3a schematically shows how two opposing arrays 21, 22 of permanent magnets 31, 32 may cause an upward net magnetic force 33. FIG. 3a shows the base structure magnetic array 21 and part of the base structure 11 to which it is attached. The base structure magnetic array 21 comprises three horizontally magnetized permanent magnets. The upper and lower magnets 31 have a left to right magnetization. The middle magnet 32 has a right to left magnetization. The shown load structure magnetic array 22 only has two horizontally magnetized permanent magnets. The upper magnet 31 has a left to right magnetization. The lower magnet 32 has a right to left magnetization. A vertical airgap 13 is formed between the opposing arrays 21, 22.

The load structure magnetic array 22 is positioned such that opposing magnets 31 with a left to right polarization are vertically displaced approximately half the height of one magnet 31. Consequently, the upper magnet of the load structure magnetic array 22 is simultaneously attracted by the upper magnet of the base structure magnetic array 21 and repelled by the middle magnet of the base structure magnetic array 21. The horizontal components of these two magnetic forces cancel each other at least partially, while the vertical components add up. The net magnetic force upon the upper magnet of the load structure magnetic array 22 is therefore directed upwards. In a similar way, the lower magnet of the load structure magnetic array 22 is also pushed upward by the magnets of the base structure magnetic array 21. The net magnetic force on the load structure 12 has a relatively large vertical component 33 and, in this example, a small horizontal component. When the vertical position of the load structure magnetic array 22 changes, also the vertical and horizontal components 33, 34 of the net magnetic force change.

Figure 3B:
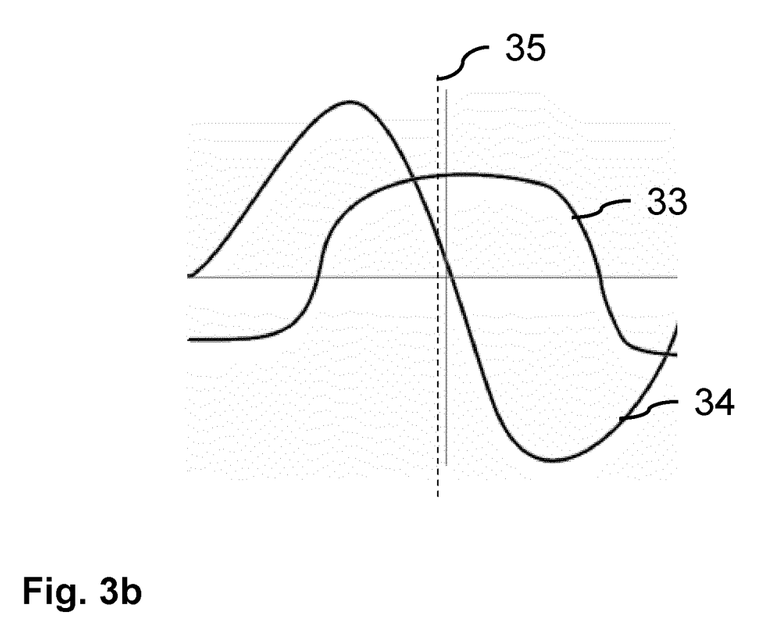
FIG. 3b shows a schematic representation of horizontal and vertical components of the net magnetic force as a function of vertical displacement of the load structure.

FIG. 3b shows a schematic representation of horizontal and vertical components 34, 33 of the net magnetic force as a function of vertical displacement of the load structure 12. This diagram shows how the vertical and horizontal components 33, 34 of the net magnetic force vary with the vertical displacement of the load structure 12. In the middle of the diagram, where the x-axis and the y-axis cross, the vertical displacement is zero. This represents the situation in which the load structure is positioned such that opposing magnets with equal polarization are vertically displaced exactly half the height of one magnet. In this situation there is no net magnetic force in the horizontal direction 34 and the vertical component 33 of the net magnetic force is at its maximum. If the vertical gravity force acting on the load structure is equal and opposite to the vertical magnetic force, the system is in a metastable equilibrium. The positive x-axis represents upward vertical displacement. The negative x-axis represents downward vertical displacement. The y-axis represents the magnitude and direction of the horizontal and vertical components 34, 33 of the net magnetic force.

Upward vertical displacement of the load structure 12 results in a slightly decreasing vertical force component and an increasing horizontal component 34 in the right to left (negative) direction. Downward vertical displacement results in a slightly decreasing vertical force component and an increasing horizontal component 34 in the left to right (positive) direction. Such horizontal components 34 can be compensated by further vertical airgaps 13 at other walls of the vibration isolator 10 (see e.g. FIG. 1b) and/or by active electromagnetic actuators. The dashed line 35 shows the vertical displacement and corresponding net magnetic force components 33, 34 for the situation of FIG. 3a.

Horizontal displacement to the right (airgap enlarged) reduces both the horizontal and vertical force component. Horizontal displacements that reduce the airgap size increase both the vertical and horizontal force component.

The big advantage of using the vertical airgaps 13 according to the invention is that the vertical component 33 of the net magnetic force does not vary much when the load structure 12 is vertically displaced. The use of additional airgaps helps minimizing the instabilities when the device is not operated in its equilibrium point, especially because the horizontal force components cancel or at least reduce each other. The vibration isolator 10 thus obtained has a low stiffness over the full range of movement.

Figure 4:
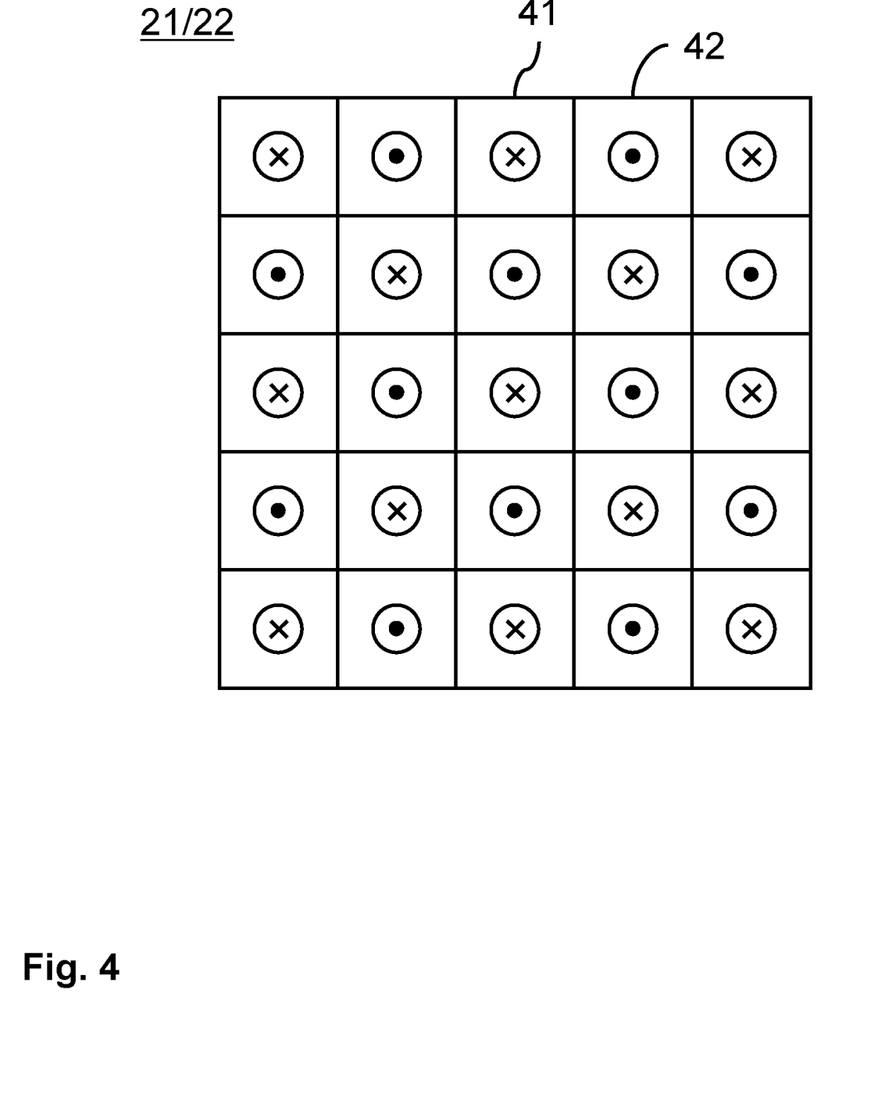
FIG. 4 shows an exemplary arrangement of permanent magnets in an array for use in the vibration isolator according to the invention.

FIG. 4 shows an exemplary arrangement of permanent magnets 41, 42 in an array 21, 22 for use in the vibration isolator 10 according to the invention. Thirteen permanent magnets 41 in the 5-by-5 array have a magnetization direction pointing into the surface shown in the figure. The remaining twelve permanent magnets 42 in the 5-by-5 array have a magnetization direction pointing into the surface shown in the figure. Arrays having other dimensions may also be used. The smallest possible array to use is a 1-by-2 array. It is also possible to use patterns, wherein different magnets have different dimensions or wherein more than two different magnetization directions are used. Part of the array may be 'empty' or filled by non-magnetized material.

Figure 5A:
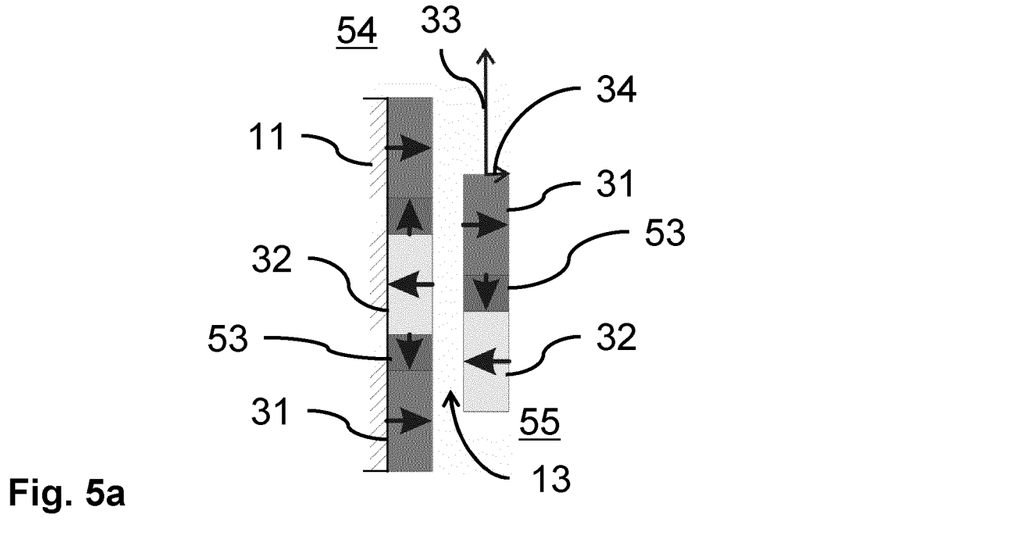
FIG. 5a shows an alternative way of arranging two opposing arrays to cause an upward net magnetic force.

FIG. 5a shows an alternative way of arranging two opposing arrays 54, 55 to cause an upward net magnetic force. Still, most of the permanent magnets 31, 32 are magnetized in a horizontal direction. Some smaller permanent magnets 53, in between the horizontally magnetized ones, are magnetized in a vertical direction. The configuration thus obtained is a Halbach or quasi-Halbach configuration. Such configurations are known for the property to focus the magnetic field to one side of the magnets only, in this case the side of the airgap.

Figure 5B:
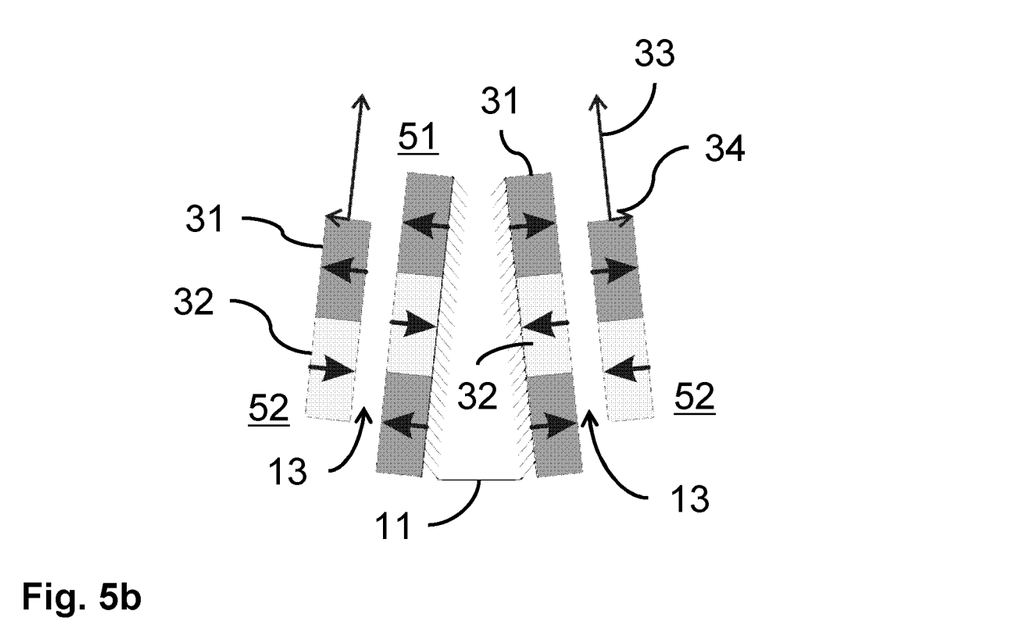
FIG. 5b shows two slightly tilted vertical air gaps.

FIG. 5b shows two slightly tilted vertical air gaps 13. In this example, the base structure 51 is situated in a receiving volume of the load structure. The walls of the base structure and the load structure are slightly tilted with respect to the direction of gravity. The horizontal components of the net magnetic forces on the load structure magnetic arrays 52 cancel each other. The load structure is pushed upward by the net magnetic force and pulled down by gravity. When both horizontal force components cancel each other, the load structure is in a metastable position. The shown arrangement of the magnetization directions in the different arrays of magnets is just one of the many possible arrangements that may result in this metastable position.

Figure 6A:
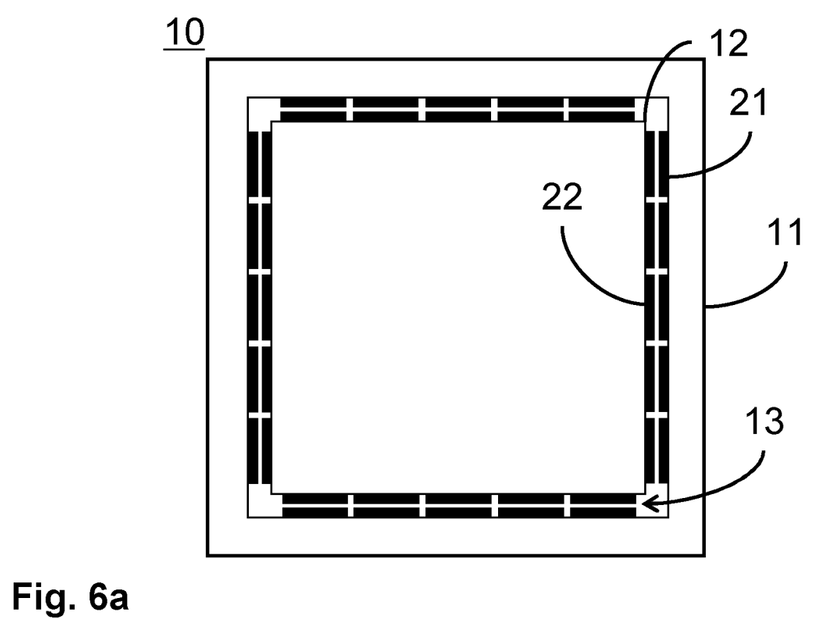
FIG. 6a shows a horizontal cross section of a vibration isolator with a square shaped receiving volume.

FIG. 6a shows a horizontal cross section of a vibration isolator 10 with a square shaped receiving volume. Here we assume that the receiving volume is part of the base structure 11, but when the vibration isolator 10 is turned upside down the receiving volume is part of the load structure 12. The opposing magnetic arrays 21, 22 form four vertical gaps 13 with different orientations. The magnetization of the permanent magnets in the arrays 21, 22 is preferably such that all horizontal components of the net magnetic force cancel each other almost fully. A disadvantage of the arrangement shown in this figure is that horizontal displacement of the load structure 12 results in a relatively large torque on this load structure 12. The magnetic array 22 which is closest to a magnetic array 21 of the base structure 11 will be pushed upward with a greater force than the magnetic array 22 in the wider vertical airgap 13. The total upward magnetic force on the load structure 12 will be the same, but the load structure will tend to rotate around the horizontal axis perpendicular to the direction of horizontal movement.

Figure 6B:
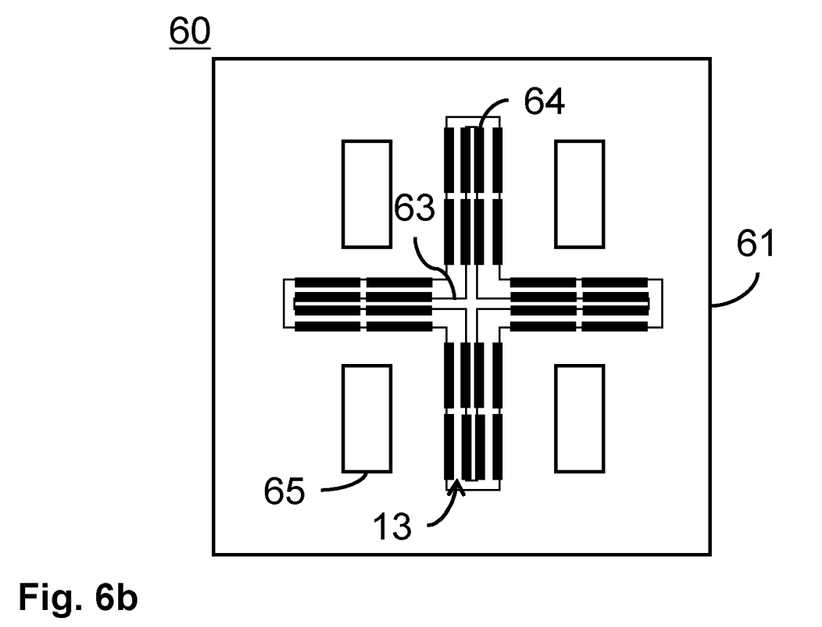
FIG. 6b shows a horizontal cross section of a vibration isolator with a cross shaped receiving volume.

FIG. 6b shows a horizontal cross section of a vibration isolator 60 with a cross shaped receiving volume. An advantage of this configuration is that a very low torque is obtained, which will improve the stability. For further improving the stability of the vibration isolator 60, active electromagnetic actuators 65 are included in the load structure 61 and/or the base structure 63. When the load structure 61 tends to depart from its stable position too much or when it starts rotating, the active electromagnetic actuators 65 can be used for bringing it back to the desired position and orientation. The electromagnetic actuators 65 may also be used when assembling the vibration isolator 60 and inserting the base structure 63 into the receiving volume for bringing it in the right position with respect to the load structure 61.

Figure 7:
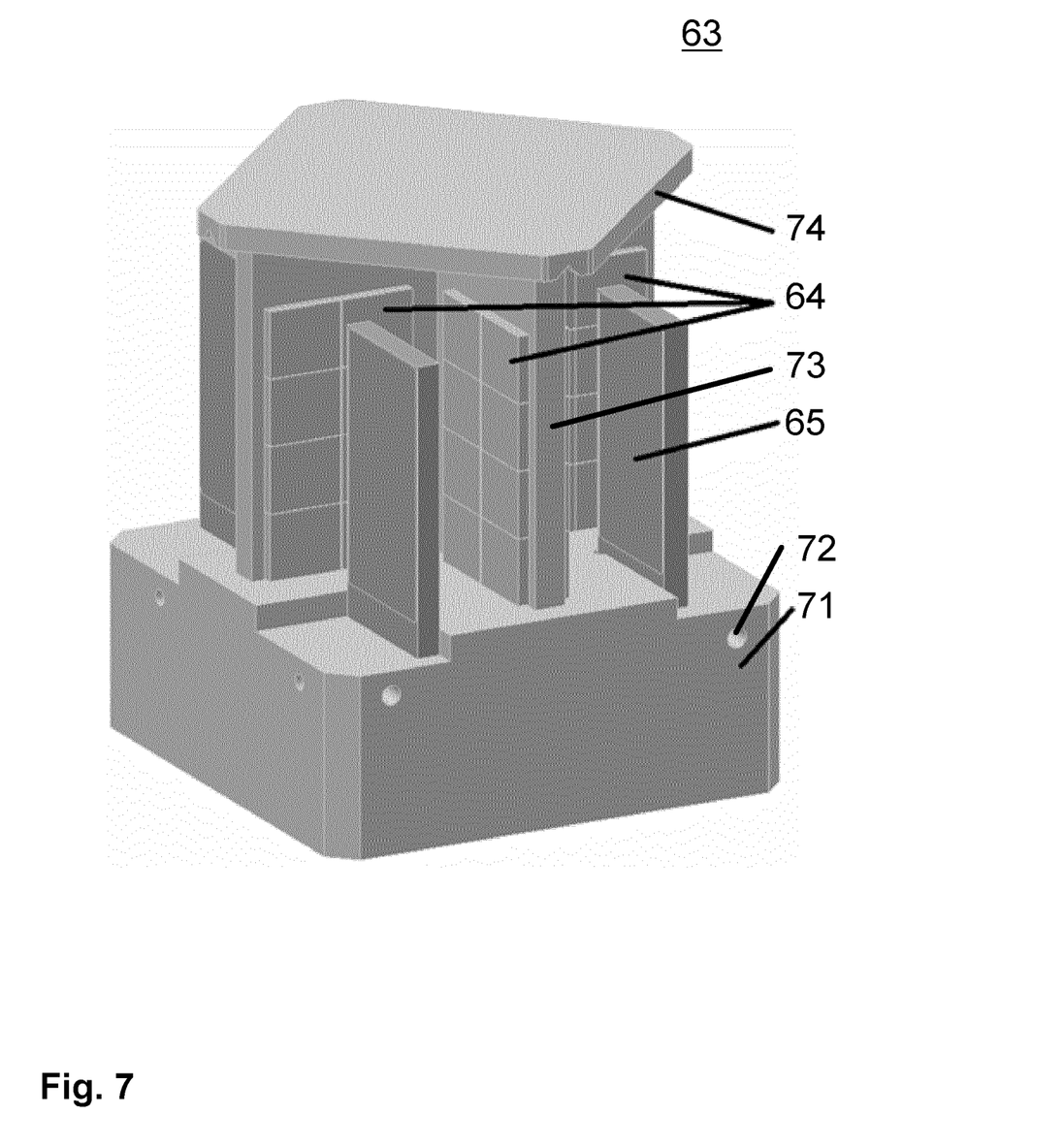
FIG. 7 shows a perspective view of a cross shaped load structure.

FIG. 7 shows a perspective view of a cross shaped base structure 63. The base structure 63 comprises a support block 71 for mounting the cross shaped array carrier 73. Arrays of permanent magnets 64 are applied to the surfaces of the cross shaped array carrier 73. In this example, four rows of magnets are provided. For example, the first and third row have a magnetization direction pointing into the array carrier 73 and the second and fourth row have a magnetization direction pointing out of the array carrier 73. Also checker board patterns and other alternating patterns may be used.

In this embodiment, active electromagnetic actuators with the coils 65 are applied to the support block 71 of the base structure 63. They interact with permanent magnets on the load structure 61 for actively controlling the position of the load structure 61 relative to the base structure 63 when the passive control by the permanent magnet arrays 64 is not sufficient. For this active control, the coils 65 may interact with the magnets of the permanent magnet arrays 64 of the load structure or with separate and dedicated control magnets (not shown) closer to the coils. Cooling ducts 72 may be provided in, e.g., the support block 71 for minimizing temperature fluctuations in the vibration isolator. Of course, it is also possible to put the coils 65 in the load structure 61 and let them interact with magnets in the base structure 63.

Instead of or in addition to the electromagnetic actuators, mechanical stops, springs or the like may be used for improving the stability of the vibration isolator and for preventing contact between the permanent magnets of the base structure 63 and the load structure 61.

A removable end stop 74 prevents the load structure 61 from being separated from the base structure 63 when the net magnetic force exceeds the gravity force, e.g. when the payload 15 is taken from the platform 14. When assembling the vibration isolator, the end stop 74 is removed and the cross shaped array carrier 61 is inserted into corresponding slots (=the receiving volume) of the base structure. From the other side of the base structure, the end stop 74 is then applied to the load structure 63 again. The load structure 63 can only be separated from the base structure if the end stop 74 is removed first.

Figure 8A:
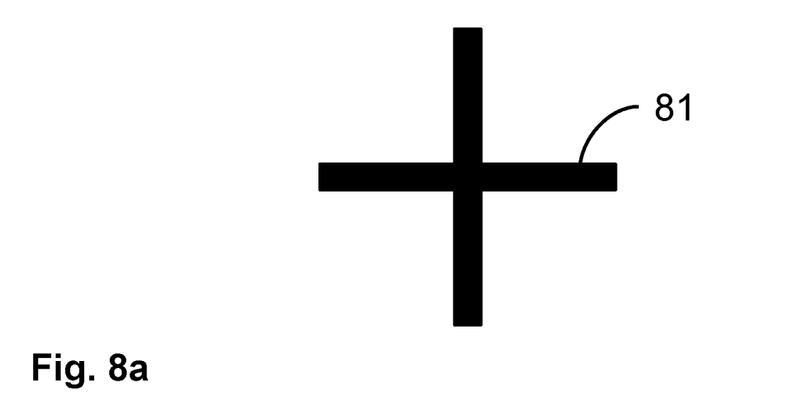
FIGS. 8a, 8b and 8c show three possible topologies of a load structure according to the invention.
Figure 8B:
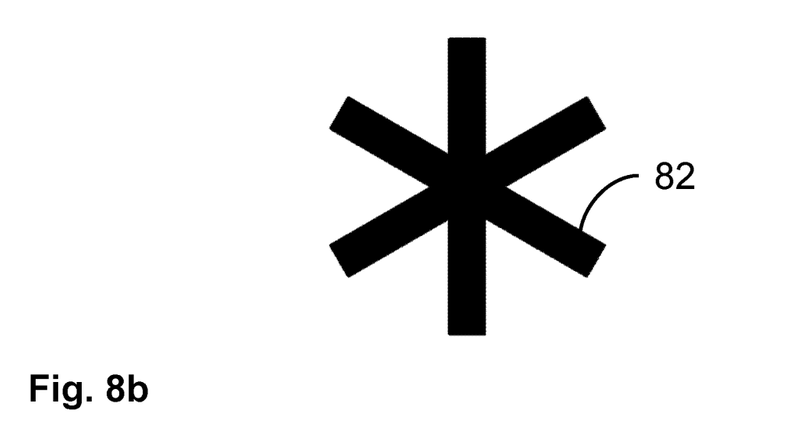
Figure 8C:
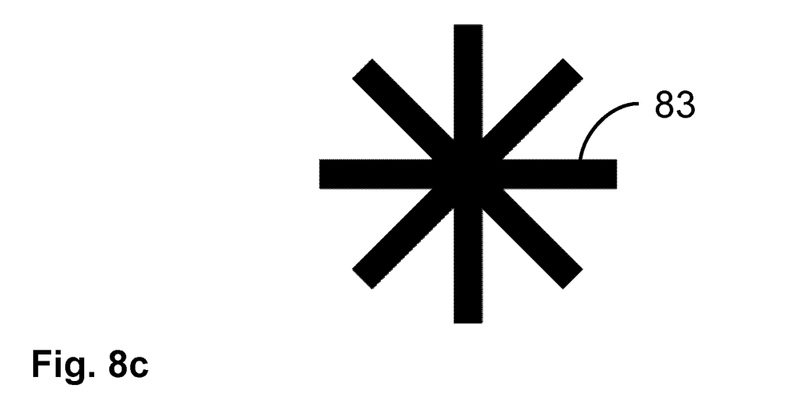

FIGS. 8a, 8b and 8c show three possible topologies of a base or load structure according to the invention. FIG. 8a shows a cross shape like already shown in FIGS. 6b and 7. FIG. 8b shows a cross with six arms and FIG. 8c shows a cross with 8 arms. In order to obtain an embodiment with low torque on the load structure, it is preferable to use thin arms.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A vibration isolator comprising:
   a base structure,
   a load structure,
   at least one vertical air gap formed by opposing and substantially parallel walls of the base structure and the load structure,
   the opposing walls being at least partly covered by respective arrays of permanent magnets, neighboring magnets in the arrays having alternating magnetization directions, wherein
   neighboring magnets in an arrangement of the permanent magnets in the arrays have alternating magnetization directions and the array of permanent magnets of the load structure is positioned such that opposing permanent magnets with a left to right polarization are vertically displaced approximately half the height of one permanent magnet such that a gravitational force on the load structure is substantially compensated by a net magnetic force of the base structure on the load structure, and wherein
   the base structure or the load structure comprises a cross shaped array carrier, the array of permanent magnets of the base structure or the load structure, respectively, being applied to the cross shaped array carrier.

2. A vibration isolator as claimed in claim 1, wherein the base structure is a box with a receiving volume and the load structure comprises a block, the shapes and dimensions of the receiving volume and the block being such that the block fits into the receiving volume in order to provide the vertical air gap, the respective arrays of permanent magnets being arranged on at least one inside wall of the receiving volume and on at least one outer wall of the block.

3. A vibration isolator as claimed in claim 2, wherein a horizontal cross section of the receiving volume has a rectangular, triangular or circular shape.

4. A vibration isolator as claimed in claim 2, wherein a horizontal cross section of the receiving volume is cross shaped.

5. A vibration isolator as claimed in claim 1, wherein the load structure is a box with a receiving volume and the base structure comprises a block, the shapes and dimensions of the receiving volume and the block being such that the block fits into the receiving volume in order to provide the vertical air gap, the respective arrays of permanent magnets being arranged on at least one inside wall of the receiving volume and at least one outer wall of the block.

6. A vibration isolator as claimed in claim 5, wherein a horizontal cross section of the receiving volume is cross shaped.

7. A vibration isolator as claimed in claim 1, wherein the base structure and/or the load structure comprise at least one electromagnetic compensating unit for actively controlling relative movements of the load structure with respect to the base structure.

8. A vibration isolator as claimed in claim 1, wherein the permanent magnets with the alternating magnetization directions form a checkerboard pattern.

9. A vibration isolator as claimed in claim 1, wherein the permanent magnets with the alternating magnetization directions form a Halbach or quasi-Halbach configuration.

10. A vibration isolator as claimed in claim 1, wherein the vertical air gap is slightly tilted with respect to a vertical axis.

11. A vibration isolator as claimed in claim 1, wherein the cross shaped array carrier comprises four or more arms.

* * * * *